United States Patent [19]

Shimazaki

[11] Patent Number: 5,082,228

[45] Date of Patent: Jan. 21, 1992

[54] SEAT ADJUSTER FOR VEHICLE SEAT

[75] Inventor: Mitsuo Shimazaki, Akishima, Japan

[73] Assignee: Tachi-S Co., Ltd., Akishima, Japan

[21] Appl. No.: 686,191

[22] Filed: Apr. 16, 1991

[51] Int. Cl.$^5$ .................................. F10M 13/00
[52] U.S. Cl. ............................ 248/430; 297/473
[58] Field of Search ............... 248/393, 429, 430; 297/344, 368, 473, 379, 346, 341

[56] References Cited

U.S. PATENT DOCUMENTS

| | | | |
|---|---|---|---|
| 3,469,812 | 9/1969 | Wonell | 248/430 |
| 4,384,701 | 5/1983 | Barley | 248/430 X |
| 4,629,254 | 12/1986 | Stolper | 297/473 |
| 4,730,804 | 3/1988 | Higuchi | 248/429 |
| 4,742,983 | 5/1988 | Nichei | 297/341 X |
| 4,781,354 | 11/1988 | Nihei | 297/379 X |
| 4,813,643 | 3/1989 | Nihei | 297/346 X |
| 4,852,846 | 8/1989 | Weier | 297/341 X |
| 4,927,110 | 5/1990 | Tsumura | 248/430 |
| 4,958,799 | 9/1990 | Clauw | 297/344 X |

FOREIGN PATENT DOCUMENTS

| | | | |
|---|---|---|---|
| 209615 | 1/1987 | European Pat. Off. | 248/430 |
| 2-6633 | 6/1991 | Japan . | |
| 2013771 | 8/1979 | United Kingdom | 248/430 |

Primary Examiner—J. Franklin Foss
Attorney, Agent, or Firm—Oldham & Oldham Co.

[57] ABSTRACT

A seat adjuster for use in automotive seat employing a pair of slide rails for fore-and-aft adjustment of the seat with a locking mechanism, wherein, at one of the two slide rails disposed adjacent to a center of the automobile, there are arranged first and second shafts, such that the second shaft, which is provided with an operation handle, is disposed lower than the second one which is connected with the locking mechanism, with a link mechanism interposed between the two shafts for their mutual simultaneous rotations. Hence, the operation handle is positioned lower close to the automobile floor and disposed adjacent to the inner or center side of the automobile, so that occupant's foot or clothes is not contacted with the handle.

6 Claims, 2 Drawing Sheets

SEAT ADJUSTER FOR VEHICLE SEAT

BACKGROUND OF THE INVENTION

1. Field of the Invention

The present invention relates to a seat adjuster by which the seat is adjusted its fore-and-aft position.

2. Description of Prior Art

In general, a seat adjuster for fore-and-aft adjustment of seat consists basically of a pair of movable rail and fixed rail, both of which are fitted together in a slidable manner, and a lock mechanism provided over the two rails for permitting locking unlocking of the movable rail against the fixed rail at a desired point along the longitudinal direction thereof. The movable rail carries a seat and fixed rail is fixed on a floor of the vehicle.

A concrete example of this seat adjuster is shown in FIGS. 1 and 2, which depict a conventional, vertically arranged type of seat adjuster. According thereto, there is provided a vertical-type slide rail (2) comprising a fixed rail (4) of a generally C-shaped configuration in section, which is fixed upon a floor of a vehicle (not shown) and a movable rail (3) fitted slidably via balls (5) within the fixed rail (4), whereupon the width-wise planes of both fixed and movable rails (4)(3) stand vertically in relation to a horizontal plane of the floor, as opposed to an ordinary flat-type slide rail.

To that movable rail (3), a seat cushion frame (1) is fixed, on which a seat cushion (c) is mounted. At the inner side of the frame (1), a shaft (8) is supported by a bearing member (7) in a rotatable way, the shaft (8) extending along the longitudinal direction of the frame (1). A lock pawl (6) is fixed to the shaft (8), with its forward end passing through the hole (1a) perforated in the frame (1).

As best seen from FIG. 2, the forward end of lock pawl (6) passes through a through-hole (3a) formed in the movable rail (3) and through one of plural lock slots (9) formed in the fixed rail (4), whereupon the slide rail (2) is in a locked state. The plural lock slots (9) are formed in an equidistant way from one another along the longitudinal direction of the fixed rail (4).

A spring (10) is provided on the shaft (8) to biasingly cause the shaft (8) to be rotated normally in a direction to cause the lock pawl (6) to be engaged in one of the plural lock slots (9).

Figures only shows the right-side seat adjuster, but though not shown, there is provided a left-side seat adjuster, hence constituting a pair of right and left seat adjusters in a way sandwiching the seat cushion (c) for bilateral locking/unlocking purpose to the seat against the fore-and-aft sliding of the movable rail (4).

At the forward end of the shaft (8), a link piece (11) is fixed, with its lower end directed downwardly.

A second link piece (12) is fixed on a left-side shaft (8') such that the piece (12) is disposed opposite to the first one (11) and directed upwardly.

A pull wire (13) is extended between the first and second link pieces (11)(12), with both ends of the wire (13) being each connected to the respective free ends of the first and second link pieces (11) (12).

The left-side shaft (8') is provided at its forward end with an operation handle (14) and disposed at the door side of the seat.

Designation (15) denotes a cushion frame for receiving the seat cushion (C), which is disposed between the two shafts (8)(8').

Operating the handle (14) results in causing synchronized, simultaneous rotation of the two link pieces (11)(12) about the respective axises of the two opposite shafts (8)(8') by virtue of the pull wire (13). Of course, the shafts (8)(8') are rotated overcoming the biasing force of the spring (10). Then, the lock pawl (6) is rotated in a direction to be disengaged from the lock slot (9), allowing fore-and-aft sliding adjustment of the seat. After having adjusted a position of the seat, release of the handle (14) allows the lock pawl (6) to be returned into engagement with another one of the lock slot (9) under the biasing force of the spring (10).

In that way, the movable rail (3) is unlocked and locked at desired point relative to the fixed rail (4), and thus the seat is adjusted in its fore-and-aft position.

However, in this vertically assembled type of seat adjuster, in case of the seat shown being disposed at the left-side half in the automobile in relation to the center thereof; namely, at the door side of the automobile, the operation handle (14) projects at a high level under the seat, adjacent to the door of the automobile. This poses a problem that an occupant, when entering into or getting out of the car, will stumble over the seat, with his or her foot or a lower part of clothes being hit or caught by the highly projected operation handle (14). Moreover, particularly if the seat is an assistant seat next to the driver's one, the door-side disposition of the handle (14) prevents access thereto from a driver on the driver's seat and the driver can not reach the handle (14) to adjust the fore-and-aft adjustment of the assistant seat. Yet further, as understandable from FIG. 2, during operation of the handle (14), the left-side link piece (11) is hindered its upward movement due to contact with the seat cushion frame (15).

SUMMARY OF THE INVENTION

In view of the above drawbacks, it is a purpose of the present invention to provide an improved seat adjuster for vehicle seat which permits an operation handle to be disposed adjacent to a center of a vehicle and lower under the seat to avoid contact of the handle with occupant's foot and clothes.

To attain such purpose, the present invention, using the foregoing prior-art seat adjuster, comprises a first shaft and second shaft provided at the centerside slide rail (corresponding to the slide rail (1)), with such an arrangement that the first shaft (corresponding to that (8)) is disposed higher than the second shaft and connected with a locking mechanism (corresponding to that (6)), and that the second shaft is provided with a handle, wherein such second shaft is operatively connected with the first one via a link mechanism, and wherein a pull wire is at its one end connected to the second shaft for interlocking purpose in the dual slide rail and locking mechanism as described in the foregoing prior art description.

Accordingly, the operation handle is disposed lower close to the floor of vehicle and adjacent to the center of vehicle, which makes the handle free from contact with foot or clothes of an occupant who enters or gets out of the vehicle at the door side.

Further, in case of the seat being an assistant seat next to a driver's seat, a driver can easily reach the handle.

In one aspect of the invention, the link mechanism is a vertically movable, parallel type of links, which prevents itself against contact with a seat cushion frame located adjacent the slide rail.

DETAILED DESCRIPTION OF PREFERRED EMBODIMENT OF THE INVENTION

First of all, the present invention is based on the above-stated prior art, utilizing most of the elements and mechanisms therein, and thus all like designations to be used in the herein description correspond to all like ones given in the prior art description above. Description is omitted for the common elements between the present invention and prior art, for the sake of simplicity.

Figure 1:
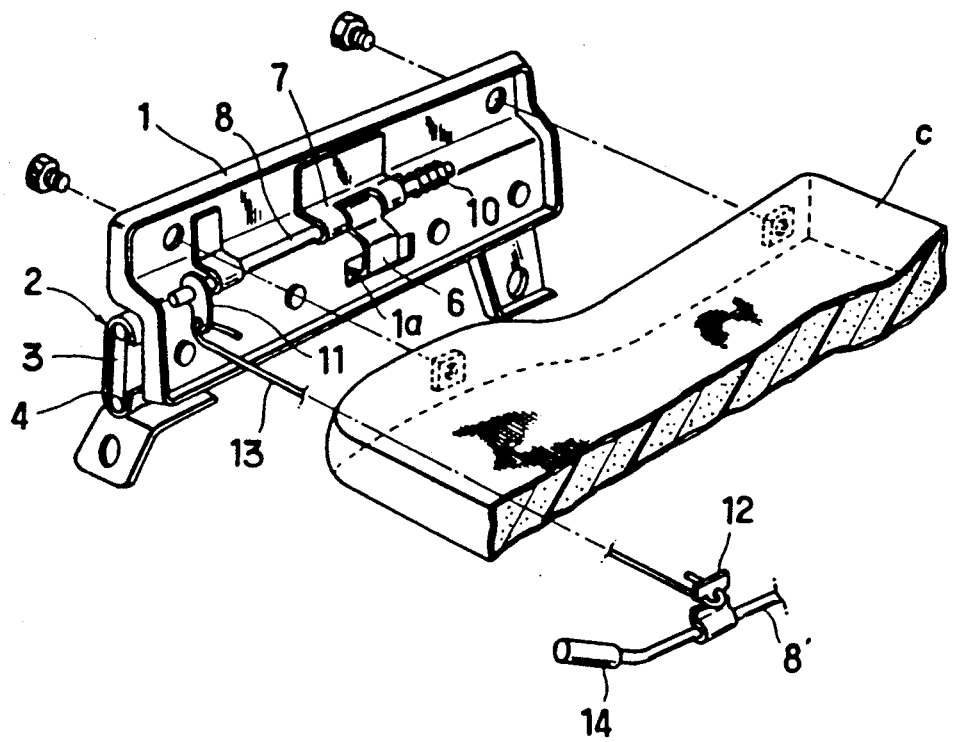
FIG. 1 is a partly broken, perspective view of a conventional seat adjuster.
Figure 2:
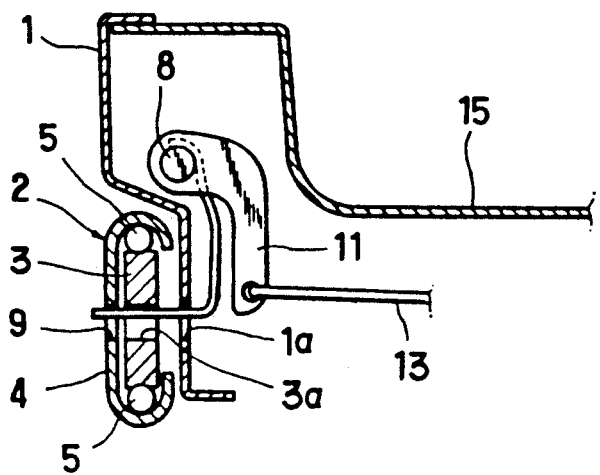
FIG. 2 is a partly enlarged sectional view of the conventional seat adjuster as in FIG. 1.
Figure 3:
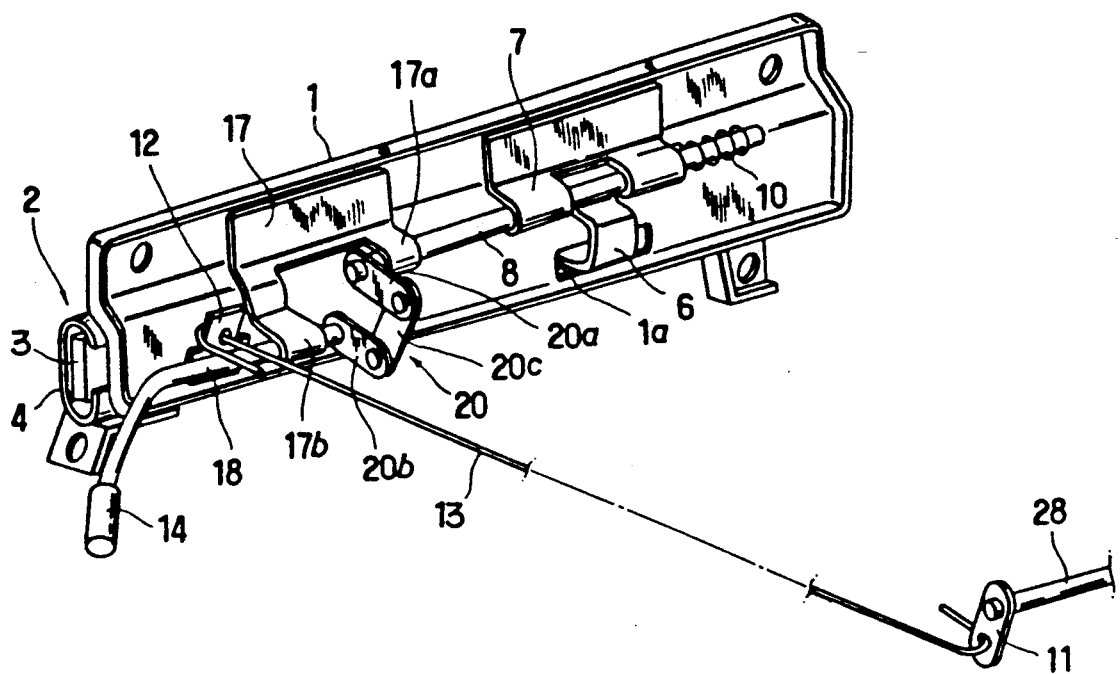
FIG. 3 is a partly broken, perspective view of a seat adjuster in accordance with the present invention.
Figure 4:
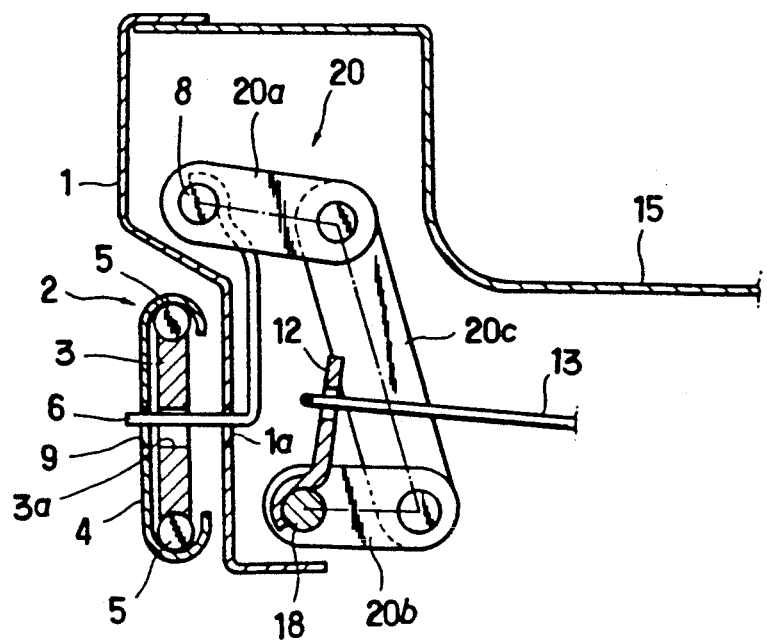
FIG. 4 is a partly enlarged sectional view of the seat adjuster as in FIG. 3.

Referring to FIGS. 3 and 4, there is shown a seat adjuster according to the present invention, which is applied to the vertical type of slide rail (2) with the locking mechanism (7, 6, 1a, 3a, 9).

As is apparent, at the forward free end of the shaft (8) provided at the left-side support bracket (1), there is arranged a link mechanism (20). To that link mechanism (20), the operation handle (14) is connected, whereupon in contrast to the prior art, the operation handle (14) is disposed at the left side of the seat; namely adjacent to the center of an automobile (not shown).

Specifically, in addition to the first bearing member (7) to which the shaft (8) is rotatably secured, another second bearing member (17) forming one of the link mechanisms (20) is fixed to the inner wall of the support bracket (1), such that the second bearing member (17) is disposed at the forward portion of the support bracket (1).

The second bearing member (17) includes a pair of spaced-apart bearing sections: Namely, a first bearing section (17a) in which the forward end of the shaft (8) is secured rotatably, and a second bearing section (17b) in which the rearward end of drive shaft (18) is secured rotatably.

The first and second bearing sections (17a)(17b) are disposed in a vertically offset relation with each other, such that the first one (17a) is at the same level with that of the shaft (8), higher than the second one (17b), whereas the second one (17b) is located lower adjacent to the lower edge of the support bracket (1), than the first one (17a). Hence, the drive shaft (18), which is supportively secured in the second bearing section (17b), is situated adjacent to and along the lower edge of the bracket (1), whereupon the operation handle (14) fixed to the forward end of the drive shaft (18) is disposed close to a floor of automobile (not shown).

Within the space between the first and second bearing members (17a)(17b), the rearward end of the drive shaft (18) and forward end of the shaft (8) project inwardly of the space in a manner opposing each other, and also in that space, the link mechanism (20) is disposed, by means of which, the drive shaft (18) is operatively connected to the shaft (8).

The link mechanism (20) comprises a pair of upper and lower link members (20a)(20b), which are projected generally on a horizontal line in parallel with each other, and an intermediate link member (20c) which is interposed between the upper and lower link members (20a)(20b), thus forming a parallel link.

The upper link member (20a) is at its base part fixed to the forward end of shaft (8) and at its outwardly projected free end connected pivotally to the upper end of the intermediate link member (20c). The lower link member (20b) is at its base part fixed to the rearward end of drive shaft (18) and at its free end connected pivotally to the lower end of the intermediate link member (20c).

The drive shaft (18) is provided with a link piece (12), to which one end of the pull wire (13) is connected.

Designation (11') denotes a link piece which is fixed to the forward end of another shaft (28) at other right-side bracket (not shown), which has been described in the previous prior art description.

The pull wire (13) is at its another end connected to such link piece (11'),

In this context, it is noted that, similar to the shaft (8') of the prior art, the shaft (28) extends along the right-side bracket opposite to the one (1) and is secured thereto rotatably, with its rearward portion being provided with a lock mechanism and spring similar to the ones (1a, 7, 6, 10) at the left-side bracket (1). Thus, operational movement of the drive shaft (18) is transmitted to the shaft (18) through the wire (13) and link pieces (11, 12).

The length of both upper and lower link members (20a)(20b) should be set to a degree that the intermediate link member (20c) is moved without contact with the seat cushion frame (15).

With the above-described structure, when the operation handle (14) is rotated counterclockwise about the axis of the drive shaft (18) for unlocking purpose, as viewed from FIGS. 3 and 4, the lower link member (20b) is simultaneously rotated in the same direction, which causes upward movement of the intermediate link member (20c) to produce synchronized counterclockwise rotation between the upper and lower link members (20a)(20b). As such, those upper and lower link members (20a)(20b) are rotated in that direction, representing a crank motion on the whole to transmit the rotation to the shaft (8), whereby the shaft (8) is caused to be rotated counterclockwise, overcoming the biasing force of the spring (10), and the lock pawl (6) is rotated towards the inside of the bracket (1), thereby being disengaged from the lock slot (9) formed in the fixed rail (4). Then, the movable rail (3) is released from the locked state with the fixed rail (4), Likewise, at the same time, the other shaft (28) is caused to be rotated counterclockwise to effect the same unlocking actions, though not shown in the figures.

Now, the seat is permitted to be adjusted forwardly and backwardly, with such unlocking state of the slide rail (2).

After adjusting the fore-and-aft position of the seat, merely releasing the handle (14) allows the biasing force of the spring (10) to rotate clockwise the shaft (8), link members (20a, 20c) and drive shaft (18), to thereby return the lock pawl (6) to engagement into another selected one of the lock slots (9).

Accordingly, by being constructed as above, the seat adjuster according to the present invention is endowed with the following advantageous effects:

(i) The operation handle (14) is located at the side of the seat adjacent to the center of the automobile, as opposed to the prior-art handle (14) being located at the door side of the same. Thus, the handle (14) is completely free from contact with the occupant's foot or clothes. Particularly, in case of the seat being an assistant seat next to a driver's seat, a driver can easily reach and operate the handle (14) for adjustment of the assistant seat.

(ii) The operation handle (14) is located at a lower level close to the floor of the automobile, by virtue of the lower disposition of the drive shaft (18) and vertically offset arrangement of the two bearing sections (17a)(17b) with link mechanism (20). This greatly reduces the possibility of the occupant's foot or lower part of his or her clothes being caught by the handle (14).

(iii) In contrast to the link piece (11) of the prior art, the vertically movable, parallel-type link mechanism (20) is positively prevented against contact with the adjacent seat cushion frame (15).

While having described the invention thus far, it should be understood that the embodiments are not necessarily restrictive thereto, but any other modifications, replacements and additions may structurally be possible without departing from the scope and spirit of the appended claims. For example, the pull wire (13) may be arranged lower with modification of the link pieces (11)(18), and further may be other rod member, instead of wire. The bracket (1), slide rail (2), lock pawl (6) and lock slots (9) may be formed in other proper structures.

What is claimed is:

1. A seat adjuster for use in an automotive seat, which has a pair of slide rails each being composed of a movable rail on which the seat is mounted and a fixed rail to be fixed to a floor of an automobile, wherein one of said pair of slide rails constitutes a center-side slide rail disposed adjacent to a center line extending centrally of and in a length-wise direction of said automobile, and another of said slide rails constitutes a door-side slide rail disposed adjacent to a door of said automobile, said movable rail being slidably fitted in said fixed rail, and further has a pair of locking mechanisms each being provided at the respective said two slide rails, said pair of locking mechanisms being actuatable together in an interlocking way so as to unlock and lock said movable rail against said fixed rail in both said two slide rails, to thereby permit adjustment of said seat in a fore-and-aft direction, said seat adjuster comprising:

a first shaft disposed at said center-side slide rail, said first shaft being connected with one of said pair of locking mechanisms which is provided at said center-side slide rail;

a second shaft disposed at said center-side slide rail, said second shaft being provided with an operation handle integrally and being located at a lower level than said first shaft;

a link mechanism interposed between said first and second shafts, wherein through said link mechanism, said second shaft is operatively connected to said first shaft;

a third shaft disposed at said door-side slide rail, said third shaft being connected with another of said pair of locking mechanisms which is provided at said door-side slide rail; and an interlocking means provided between said second shaft and said third shaft, wherein through said interlocking means, operation of said operation handle causes both said first and third shafts to be rotated, thereby actuating said pair of locking mechanisms together in interlocking way.

2. The slide adjuster as defined in claim 1, wherein said pair of slide rails are each of a vertically arranged type in which width-wise planes of said movable and fixed rails stand in a vertical direction relative to a horizontal plane of said floor of automobile, and wherein, to each of said vertically arranged pair of slide rails, there is fixedly provided a bracket on which said shafts and locking mechanism are mounted.

3. The slide adjuster as defined in claim 1, wherein said interlocking means comprises a pull wire whose one end is connected with said second shaft at said center-side slide rail and whose another end is connected with said third shaft at said door-side slide rail.

4. The slide adjuster as defined in claim 1, wherein at said center-side slide rail, there is provided a bearing means for supporting said first and second shafts, said bearing means including a pair of spaced-apart first bearing section and second bearing section, wherein said first and second bearing sections are arranged in a vertically offset relation with each other such that said first bearing section is located at a higher level that said second bearing section, and wherein, in a space between said first and second bearing sections, said link mechanism is interposed such as to operatively communicate said second shaft with said first shaft.

5. The seat adjuster as defined in claim 1, wherein said link mechanism comprises a first link member whose base part is fixed to a free forward end of said first shaft, a second link member whose base part is fixed to a rearward free end of said second shaft, and a third link member whose upper end is pivotally connected to a free end of said first link member and whose lower end is pivotally connected to a free end of said second link member, in such a manner that said first and second link members extend in parallel with each other, thereby forming a parallel link.

6. The seat adjuster as defined in claim 5, wherein a seat, to which is applied said seat adjuster, includes a seat cushion frame in vicinity of said link mechanism, and wherein said first and second link member are each formed in such a length that said third link member is not contacted with said seat cushion frame while those all said link members are being moved.

* * * * *